United States Patent [19]
Stieringer et al.

[11] 3,871,756
[45] Mar. 18, 1975

[54] MOTION PICTURE CAMERAS WITH AUTOMATIC FOCUSSING MEANS

[75] Inventors: Albert Stieringer, Stadt; Gerhard Börner, Musbert, both of Germany

[73] Assignee: Robert Bosch Photokino GmbH, Stuttgart, Germany

[22] Filed: June 7, 1973

[21] Appl. No.: 367,973

[30] Foreign Application Priority Data
June 19, 1972 Germany............................ 2229615

[52] U.S. Cl.................... 352/140, 352/141, 354/25
[51] Int. Cl.............................................. G03b 3/10
[58] Field of Search................ 352/139, 140, 91 C; 95/44 C; 354/25, 141

[56] References Cited
UNITED STATES PATENTS

| | | |
|---|---|---|
| 3,538,830 | 11/1970 | Henriksen et al.................. 352/140 |
| 3,538,831 | 11/1970 | Mueller............................. 352/140 |
| 3,643,574 | 2/1972 | Moriyama et al.................. 95/44 C |
| 3,695,752 | 10/1972 | Nozawa............................ 352/91 C |

*Primary Examiner*—Samuel S. Matthews
*Assistant Examiner*—Russell E. Adams, Jr.
*Attorney, Agent, or Firm*—Michael S. Striker

[57] ABSTRACT

A motion picture camera wherein the position of the lens relative to the film plane is adjustable by automatic focussing means having a rotary focus ring and a servomotor which can rotate the focus ring clockwise or counterclockwise through angles of varying magnitude as a function of changes of the distance from a selected subject. The focus ring can be arrested by a manually pivotable blocking lever or the motor can be disconnected from the energy source by a normally closed switch when the user wishes to prevent changes in the position of the lens, for example, to prevent a foreign object which moves into the field of view from influencing the focussing means. The vane or vanes of a diaphragm which is adjustable by an automatic exposure control can be held against movement by a manually actuatable lever or by a pushbutton which thereby prevents changes in the aperture size while the user makes exposures of a selected subject by preventing the exposure control from changing the position of the vane or vanes. The actuating means for the blocking and arresting means are placed sufficiently close to each other to be manipulable by a single finger which, if desired, can also serve to depress the camera release button.

17 Claims, 2 Drawing Figures

3,871,756

MOTION PICTURE CAMERAS WITH AUTOMATIC FOCUSSING MEANS

BACKGROUND OF THE INVENTION

The present invention relates to improvements in photographic apparatus in general, and more particularly to improvements in motion picture cameras which are provided with automatic focussing means.

It is already known to provide a motion picture camera with an automatic focussing system which can be actuated or started to thereby automatically select the distance of the lens from the film plane as a function of the distance from the subject. As a rule, the focussing system is actuated prior to the making of a series of exposures (e.g., by closing an electric switch) and remains operative for a selected interval of time, normally until after the completion of the last exposure of a whole series. It is customary to mount the aforementioned switch in or on a discrete housing which further contains one or more sources of electrical energy and other parts of the automatic focussing system. The switch is opened to deactivate the focussing system when the camera is not in use as well as when the operator wishes to make exposures with manual focussing. This is desirable in order to save electrical energy, to protect the automatic focussing system from damage when the focus ring is turned by hand, as well as to prevent the focussing system from interfering with manual adjustment of the focus ring.

For obvious reasons, the recently developed automatic focussing systems are designed to react to any and all changes of the distance between the subject and the camera without any appreciable delay, i.e., the angular position of the focus ring changes practically simultaneously with changes of the distance between the lens and a subject, for example, between the lens and a vehicle, animal or person moving closer to or further away from the operator of the camera. It happens quite frequently that, during picture taking, an object moves into the field of view between the camera and the subject to be photographed whereby the emergence of such object in the field of view initiates a practically instantaneous adjustment of the focus ring by the automatic focussing system. In other words, the lens is adjusted in such a way that the image of the object is focussed in the plane of the foremost unexposed film frame. This might be highly undesirable, for example, when a vehicle or a person moves across the field of view while the lens is trained upon a more distant subject, such as a building or the like. When the object disappears from the field of view, the focus ring is automatically adjusted again so as to insure sharp imaging of the selected subject onto the frames of motion picture film. It will be seen that, when a camera which embodies or is combined with the just discussed automatic focussing system is in actual use, the sharpness of the image of a selected subject or scene is likely to vary in response to movement of objects or persons into or across the space between the camera and the selected subject. Such variations in the sharpness of images of selected subjects are unpleasant during viewing of exposed and developed motion picture film.

SUMMARY OF THE INVENTION

An object of the invention is to provide a motion picture camera with automatic focussing means which can be temporarily deactivated or rendered ineffective at the will of the user to thus prevent foreign objects which enter into the space between a selected subject and the picture taking lens from influencing the operation of the focussing means during the making of one or more exposures.

Another object of the invention is to provide the camera with novel and improved deactivating or blocking means for the automatic focussing means and to construct, assemble and mount the blocking means in such a way that it can be readily located by the user without actually looking at its parts and without being compelled to use more than a single finger for actuation of the blocking means.

A further object of the invention is to provide the camera with blocking means which can be used to prevent the automatic focussing means from changing the position of the lens during the making of a single exposure or during the making of any desired number of successive exposures.

An additional object of the invention is to provide a motion picture camera which embodies the aforediscussed blocking means with novel and improved means for insuring that the size of the aperture which is defined by an automatically adjustable diaphragm remains unchanged during the making of one or more exposures which may but need not be those exposures which are being made while the focussing means is incapable of changing the position of the lens.

The invention is embodied in a motion picture camera which comprises a housing, picture taking lens means which is mounted in or on the housing for movement between a plurality of positions at different distances from the film plane, i.e., from the plane of the foremost unexposed film frame, automatic focussing means which is operatively connected with the lens means and is operative to select the position of the lens means relative to the film plane as a function of the distance from a selected subject, and deactivating or blocking means which is actuatable at the will of the operator to effect a retention of the lens means in a position previously selected therefor by the focussing means. For example, and assuming that the focussing means has selected for the lens means a position which is a function of the distance from a stationary subject, and further assuming that the user thereupon wishes to make one or more exposures of such subject, all the user has to do is to actuate the blocking means to thus insure that the automatic focussing means cannot change the position of the lens means as long as the blocking means remains actuated, e.g., for the duration of a single exposure or two or more exposures. This insures that the focussing means cannot change the position of the lens means in response to entry of an object into the field of view between the lens means and the selected subject.

The blocking means may comprise a pivotable blocking member which can be moved by hand (preferably by the finger which actuates the release means of the camera) to a position in which a portion thereof directly engages the customary focus ring of the focussing means so that the ring cannot rotate and is thus prevented from changing the position of the lens means relative to the film plane. Alternatively, the blocking means may comprise a normally closed electric switch which is connected between a current consuming device (e.g., an electric motor) of the focussing means and a source of electrical energy for the motor (such source may constitute an electric evaluating circuit which can determine the direction and the extent of angular movement of the motor in dependency on the distance from the selected subject). when the switch is opened, e.g., by a depressible pushbutton or analogous actuating means, the motor cannot rotate the focus ring so that the position of the lens means remains unchanged as long as the switch remains open.

In accordance with another feature of the invention, the motion picture camera further comprises an adjustable diaphragm whose vane or vanes are movable between a plurality of positions in each of which the diaphragm defines an aperture of a different size. The diaphragm is operatively connected with a suitable automatic exposure control which is capable of moving the vane or vanes as a function of changes in scene brightness so that the size of the aperture is a function of the prevailing scene brightness. The camera may be provided with manually actuatable arresting means which can effect a retention of the movable vane or vanes in a position previously determined by the exposure control so that the aperture size remains unchanged as long as the arresting means remains actuated. It is desirable to mount the actuating means for the blocking means and the actuating means for the arresting means in or on the housing (e.g., on the top wall or on the front wall of the housing) in such a way that a single finger suffices to actuate the blocking means simultaneously with the arresting means or to actuate one of these means independently of the other means. The arresting means further insures that the user of the camera can make highly satisfactory exposures of a selected subject even if a foreign object (e.g., an automobile) moves into the field of view during the taking of one or more pictures. In the absence of the arresting means, the exposure control would be likely to change the aperture size because the brightness of the foreign object might be entirely different from the brightness of the selected subject.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
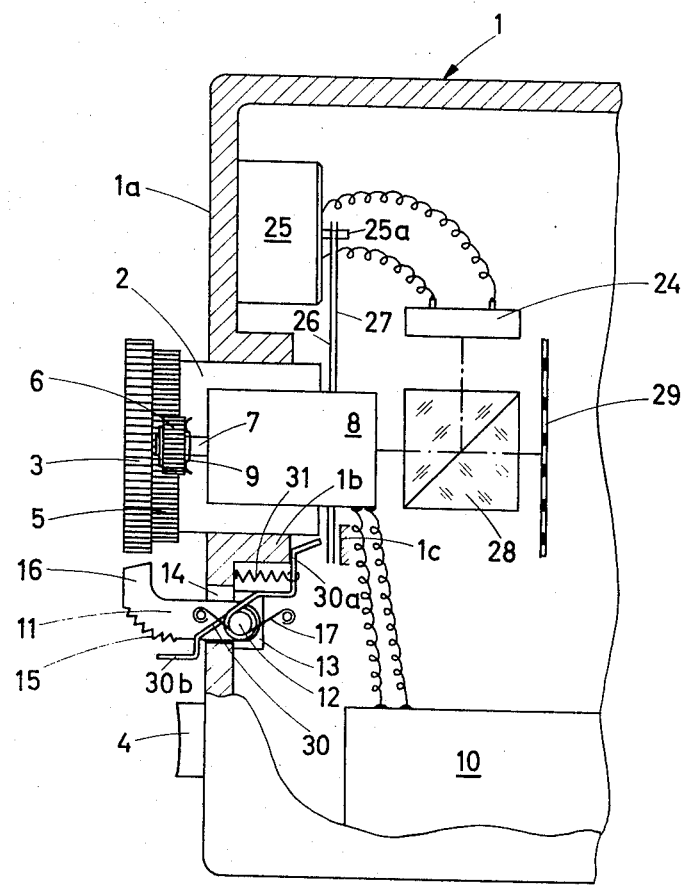
FIG. 1 is a fragmentary diagrammatic longitudinal vertical sectional view of a motion picture camera which embodies one form of the invention.

FIG. 1 illustrates a portion of a motion picture camera including a housing or body 1 having a front wall 1a which supports a picture taking lens 2. The latter is adjustable by automatic focussing means so as to insure that the selected subject is properly imaged onto the foremost unexposed film frame. The focussing means comprises a rotary knurled focus ring 3 which is coaxial with the barrel for the picture taking lens 2 and is rigid with a gear 5 in mesh with a pinion 6 which is rotatable on the output shaft 7 of a reversible electric servomotor 8. The servomotor 8 can rotate the shaft 7 clockwise or counterclockwise, depending on the nature and intensity of signals furnished by an evaluating circuit 10. An elastic washer 9 which rotates with the shaft 7 and bears against the adjacent end face of the pinion 6 constitutes a simple friction clutch which enables the shaft 7 to rotate while the parts 3, 5, 6 are held against angular movement. A release button 4 which can be actuated to start the camera motor (not shown) is mounted in the front wall 1a at a level below but relatively close to the focus ring 3.

The means for transmitting signals to the evaluating circuit 10 as a function of changes in the distance between the lens and the subject is of conventional design and, therefore, its parts are not shown in the drawing.

A device for automatically focusing a picture taking lens capable of beeing used in the camera of the present invention is described for instance, in U.S. Pat. No. 3,504,610. Such device may comprise a pair of photoelectric receivers, which receive object-images of different f-numbers respectively, converting the contrasts of the images into corresponding electrical currents, which are compared in the evaluating circuit 10 which, in turn, causes the servomotor 8 to rotate the shaft 7 clockwise or counterclockwise and through an angle which is needed for proper focussing. The circuit 10 is preferably installed in the housing 1. The adjustment of the parts 3, 5, 6 of the focussing means is normally automatic so that the operator need not be concerned with the angular position of the focus ring 3. The motion transmitting connection between the focus ring 3 and the lens 2 may comprise an adjustable tube with screw threads or any other suitable device which can move the lens toward or away from the plane of motion picture film 29 in response to rotation of the focus ring.

In order to prevent changes in the angular position of the focus ring 3 during the making of one or more exposures, for example, to prevent an object which moves in front of a selected subject from influencing the angular position of the focus ring 3, the motion picture camera of FIG. 1 is provided with novel means for blocking the movements of the focus ring 3 at the will of the operator. This enables the operator to take a desired number of pictures of a selected subject with accurate focussing in spite of the fact that the operation of focussing means is normally automatic and even if an object happens to move across the field of view between the camera and the selected subject so that such object would normally influence the angular position of the focus ring 3.

The blocking means comprises a lever 11 which is installed between the focus ring 3 and the release button 4. The lever 11 is pivotable on a pin 12 mounted in a bracket 13 at the inner side of the front wall 1a which is formed with a slot 14 through which the lever extends forwardly. The exposed portion of the lever 11 has a knurled or serrated convex handgrip portion or actuating means 15 enabling the operator to pivot the lever clockwise, as viewed in FIG. 1, against the opposition of a torsion spring 17. A projection or portion 16 of the lever 11 is thereby moved into engagement with the knurled peripheral surface of the focus ring 3 so that the latter is held against rotation as long as the operator continues to push the handgrip portion 15 upwardly, i.e., toward the lens 2.

The idle position of the lever 11 is selected in such a way that the finger which exerts pressure upon the release button 4 can be used to simultaneously pivot the projection 16 into engagement with the focus ring 3. The spring 17 automatically returns the lever 11 to the illustrated idle position as soon as the operator decides to terminate or sufficiently reduce the finger pressure upon the handgrip portion 15. The operator can decide to maintain the lever 11 in its operative position during the making of a single exposure or during the making of a series of successive exposures. The friction clutch 9 enables the servomotor 8 to rotate its shaft 7, when necessary, even if the projection 16 engages and holds the focus ring 3 against angular movement. This reduces the likelihood of damage to the servomotor 8, evaluating circuit 10 and/or other parts of the automatic focussing means. The latter is free to automatically change the angular position of the focus ring 3 (e.g., during the photographing of a moving subject) as soon as the spring 17 is free to disengage the projection 16 from the focus ring 3.

The motion picture camera of FIG. 1 further comprises an automatic exposure control which determines the size of the aperture furnished by a diaphragm having two blades or vanes 26, 27. The exposure control comprises a photoelectric receiver 24 which is in circuit with a light meter 25 (e.g., a moving coil instrument) and receives light from a light dividing mirror 28 located behind the lens 2. The mirror 28 permits some light to reach the foremost unexposed frame of the motion picture film 29 and reflects the remaining light against the photosensitive surface of the receiver 24. At least one of the vanes 26, 27 is movable (preferably pivotable) by the output element 25a of the light meter 25 so that the size of the aperture furnished by the vanes 26, 27 is normally a function of scene brightness.

In order to prevent the exposure control from reacting in response to entry of an object into the field of view in front of a selected subject or scene, the camera is further provided with arresting means for holding the vanes 26, 27 against movement by the output element 25a of the light meter 25. An object which enters in front of the selected subject might have a different reflectivity so that it changes the amount of light reaching the photoelectric receiver 24 to thereby change the size of the aperture. The arresting means is actuatable at the will of the user of the camera, for example, simultaneously with the blocking lever 11 so that, when the vanes 26, 27 are held against angular movement under the action of the light meter 25, the focus ring 3 is held against angular movement under the action of the servomotor 8. In this way, the user insures that the aperture size is best suited for the making of satisfactory exposures of a selected subject even if an object happens to move into the field of view, i.e., into the space between the lens 2 and the selected subject.

The arresting means of the camera shown in FIG. 1 comprises a resilient two-armed lever 30 which may consist of elastic wire and is pivotable about the axis of the pin 12 for the blocking lever 11. The arm 30a of the arresting lever 30 can engage the adjacent end portions of the vanes 26, 27 to press the vanes against a stationary back support or anvil 1c in the interior of the housing 1. The other arm 30b of the arresting lever 30 constitutes an actuating means and extends forwardly through the slot 14 of the front wall 1a to form a handle which can be engaged by the finger pressing the release button 4 and engaging the knurled actuating portion 15 of the blocking lever 11. As shown, the handle 30b extends into the space between the knurled portion 15 and the release button 4. A helical spring 31 is anchored at the inner side of the front wall 1a and serves to bias the arresting lever 30 counterclockwise so as to normally maintain the arm 30a out of engagement with the vanes 26, 27 of the diaphragm. The arm 30a then abuts against a stop 1b at the inner side of the front wall 1a.

If the user decides to arrest the vanes 26, 27 during the making of one or more exposures, the finger which presses the release button 4 (or another finger) is caused to pivot the handle 30b clockwise against the opposition of the spring 31 so that the arm 30a engages the vanes 26, 27 and biases them against the anvil 1c with a force which suffices to insure that the angular positions of the vanes cannot be changed by the light meter 25. Since the torque which the light meter can furnish is rather small, a relatively weak frictional engagement between the vanes 26, 27 and the anvil 1c suffices to hold the vanes in angular positions in which the diaphragm defines an aperture of an optimum size for the making of exposures of a selected subject or scene. Such fixed aperture size, combined with holding of the focus ring 3 by the blocking lever 11, enables the operator to make satisfactory exposures of a selected subject even if a foreign object happens to move into the field of view during the making of such exposures.

Figure 2:
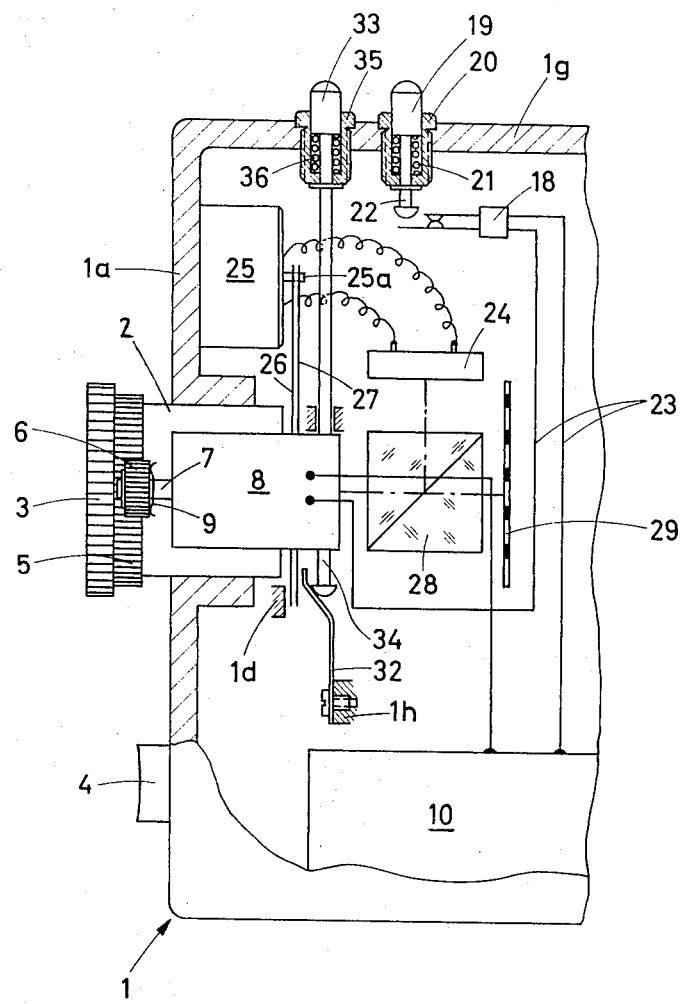
FIG. 2 is a similar view of a modified motion picture camera.

In the motion picture camera of FIG. 2, the blocking lever 11 is replaced by a switch 18 which is normally closed and can be opened in response to depression of actuating means here shown as a pushbutton 19 which is reciprocably mounted in a sleeve 20. The sleeve 20 is installed in the top wall 1g of the camera housing 1. The blocking switch 18 is connected in series with the servomotor 8 and with the evaluating circuit 10; thus, when the switch 18 is open, the signals from the circuit 10 cannot cause the servomotor 8 to rotate the output shaft 7 clockwise or counterclockwise. A helical spring 21 reacts against the sleeve 20 and biases the pushbutton 19 upwardly, as viewed in FIG. 2, so that the blocking switch 18 is normally closed and the automatic focussing means is operative to rotate the focus ring 3 in a direction and through an angle which is a function of the distance of the lens 2 from the selected subject or scene. The inner end portion of the pushbutton 19 is connected to or provided with a trip 22 which can move the lower contact of the blocking switch 18 away from the upper contact when the pushbutton 19 is depressed by hand. The conductor means which connects the blocking switch 18 in circuit with the servomotor 8 and evaluating circuit 10 is shown at 23.

It is assumed that the switch 18 is closed and that the operator of the camera wishes to make a series of exposures. Prior to the making of such exposures the automatic focussing means is actuated (e.g., by closing an electric switch) so that the servomotor 8 can rotate the focus ring 3 in order to insure that the image of the selected subject or scene is properly focussed on the foremost unexposed frame of the motion picture film 29. Then the release button 4 is depressed, to start the camera motor (not shown). If the user desires to deactivate the automatic focussing means, the pushbutton 19 is depressed so that the trip 22 opens the blocking switch 18 with the result that the servomotor 8 is disconnected from the evaluating circuit 10 and the angular position of the focus ring 3 remains unchanged as long as the blocking switch 18 remains open. The focussing means is operative again as soon as the spring 21 is free to return the pushbutton 19 to the illustrated starting position.

The motion picture camera of FIG. 2 further comprises slightly modified arresting means for the diaphragm vanes 26 and 27. The arresting means comprises a leaf spring 32 which is anchored in the housing 1, as at 1h, and can urge the adjacent portions of the vanes 26, 27 against a stationary back support or anvil 1d in response to depression of a second actuating means or pushbutton 33 mounted in a sleeve 35 which is installed in the top wall 1g of the housing 1. A helical spring 36 reacts against the sleeve 35 and urges the pushbutton 33 to the illustrated starting position. The means for transmitting motion from the pushbutton 33 to the leaf spring 32 comprises a rod 34 which is reciprocable in bearings provided therefor in the housing 1 and flexes the upper end portion of the spring 32 in a direction to the left, as viewed in FIG. 2, when the pushbutton 33 is depressed. The pushbuttons 19 and 33 are sufficiently close to each other to be depressible by a single finger of the operator. It is clear that the operator can depress only the pushbutton 19 or only the pushbutton 33. This also applies for the levers 11 and 30 of the motion picture camera shown in FIG. 1. Thus, the user can deactivate the automatic focussing means independently of or together with arresting of the vanes 26, 27 or the vanes 26, 27 can be arrested independently of the condition of the focussing means. The camera of FIG. 1 exhibits the additional advantage that the finger or hand which actuates the release button 4 can be used to simultaneously pivot the lever 11 and/or 30.

Another advantage of the motion picture camera of FIG. 1 is that the operation of the drive means (motor 8, evaluating circuit 10 and the aforementioned range finder viewer means) remains unaffected by the actuation of blocking means, i.e., that the portion 16 of the lever 11 can engage and hold the focus ring 3 in response to application of finger pressure against the handle 15 while the operation of the remaining parts of the automatic focussing means remains undisturbed. The friction clutch 9 then enables the motor 8 to rotate the output shaft 7 clockwise or counterclockwise while the portion 16 engages the focus ring 3.

The motion picture camera of FIG. 2 exhibits the advantage that the positions of the parts of the blocking means can be selected practically at will. Thus, the switch 18 and the pushbutton 19 can be mounted in the space which is available in or on the housing 1. All that counts is to install the switch 18 in such a way that it can disconnect a current consuming unit (e.g., the motor 8) from the source of electrical energy therefor (such as the circuit 10) when the user decides to actuate the blocking means, i.e., to prevent the focussing means from changing the position of the lens 2 relative to the film plane for a desired interval of time. In the camera of FIG. 2, the friction clutch 9 is optional because the switch 18 can prevent the motor 8 from rotating the shaft 7 when the user wishes to hold the lens 2 at a selected distance from the film plane.

The arresting means for the vanes 26, 27 exhibits the important advantage that it prevents foreign objects which enter the field of view from changing the f/stop while the user makes exposures of a selected subject. Such foreign objects are likely to influence the f/stop whenever the brightness of foreign objects is different from the brightness of a selected subject. A combination of arresting means for the adjustable diaphragm with blocking means for the lens enables the user to make highly satisfactory exposures of a selected subject even if one or more foreign objects happen to enter the space between the lens and the subject.

The improved motion picture camera is susceptible of many additional modifications without departing from the spirit of the invention. For example, the blocking switch 18 of FIG. 2 can be installed between the evaluating circuit 10 and the source of electrical energy for this circuit. Also, the release button 4 can be used as a means for blocking the focussing means and/or for arresting the diaphragm vanes 26, 27. To this end, the release button can be constructed and mounted in such a way that it is depressible from the illustrated idle position to a first position in which it starts the camera motor, thereupon to a second position in which it blocks the focussing means or arrests the vanes 26, 27 and finally to a third position in which it blocks the focussing means and arrests the vanes 26, 27. Moreover, the levers 11, 30 of FIG. 1 or the pushbuttons 19, 33 off FIG. 2 can be replaced by a single lever or a single pushbutton which blocks the focussing means in a first position, which arrests the vanes 26, 27 in a second position (or vice versa) and which blocks the focussing means and arrests the vanes in a third position. All such modifications will be readily comprehended upon perusal of the preceding disclosure.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a motion picture camera, a combination comprising a housing; release means mounted in said housing and being actuatable to initiate the making of exposures; picture taking lens means mounted in said housing for movement between a plurality of positions at different distances from the film plane; automatic focussing means operatively connected with said lens means and operative to normally select the position of said lens means relative to the film plane — while said release means is actuated — as a function of the distance from a selected subject and to change the position of said lens means — while said release means is actuated — in response to changes in said distance; and blocking means actuatable at the will of the operator — while said release means is actuated — to effect a retention of said lens means in a position selected therefor by said focussing means whereby said lens means remains in said selected position, even if said distance changes, as long as said blocking means remains actuated.

2. A combination as defined in claim 1, wherein said blocking means comprises a portion movable by hand from a first position in which said focussing means is free to select the position of said lens means and a second position in which said blocking means prevents said focussing means from moving said lens means.

3. A combination as defined in claim 1, wherein said portion of said blocking means being located between said lens means and said release means.

4. A combination as defined in claim 3, wherein said housing comprises a front wall movably supporting said lens means, said release means and said portion of said blocking means.

5. A combination as defined in claim 1, wherein said focussing means comprises a rotary focus ring arranged to transmit motion to said lens means and drive means for rotating said focus ring in directions and through angles depending on changes in the distance from a selected subject, said blocking means comprising a blocking member mounted in said housing and movable by hand between a first position in which said focus ring is free to rotate under the action of said drive means and a second position in which said blocking member prevents rotation of said focus ring.

6. A combination as defined in claim 5, wherein said blocking member is a lever which is pivotable between said positions thereof and further comprising means for yieldably biasing said lever to said first position.

7. A combination as defined in claim 6, wherein said lever comprises a first portion which is engageable by hand to facilitate the movement of said lever to said second position and a second portion which directly engages said focus ring in said second position of said lever.

8. A combination as defined in claim 5, wherein said drive means comprises a prime mover having an output element and friction clutch means for normally transmitting motion from said output element to said focus ring and for permitting said prime mover means to move said output element in said second position of said blocking member.

9. A combination as defined in claim 1, wherein said focussing means comprises current consuming means and said blocking means comprises normally closed switch means arranged to connect said current consuming means with a source of electrical energy and actuating means operable by the user to open said switch means and to thereby disconnect said current consuming means from said source.

10. A combination as defined in claim 9, wherein said current consuming means comprises an electric motor arranged to effect the movements of said lens means and said source of energy is an electric circuit, said switch means being connected in series with said motor and said circuit.

11. A combination as defined in claim 9, wherein said actuating means comprises a spring-biased pushbutton mounted in said housing.

12. A combination as defined in claim 1, further comprising an adjustable diaphragm mounted in said housing and having vane means movable between a plurality of positions in each of which said diaphragm defines an aperture of a different size, exposure control means operative to move said vane means to a position in which the size of said aperture is a function of scene brightness, and arresting means actuatable to retain said vane means in a position previously determined by said exposure control means.

13. A combination as defined in claim 12, further comprising discrete first and second actuating means for said blocking means and said arresting means.

14. A combination as defined in claim 13, wherein said first and second actuating means are movably mounted in said housing sufficiently close to each other to be movable by a single finger, either simultaneously or independently of each other.

15. A combination as defined in claim 12, wherein said blocking and arresting means respectively comprise first and second levers pivotably mounted in said housing and having closely adjacent handgrip portions.

16. A combination as defined in claim 12, wherein said arresting means comprises a back support provided in said housing and means for biasing said vane means against said back support so that said vane means is held by friction against movement under the action of said exposure control means.

17. A combination as defined in claim 16, wherein said means for biasing said vane means against said back support comprises a resilient element.

* * * * *